United States Patent [19]

Beran et al.

[11] Patent Number: 5,073,034

[45] Date of Patent: Dec. 17, 1991

[54] SINGLE THERMISTOR/ANALOG CONVERTER SUBSTITUTE FOR A DUAL THERMISTOR NETWORK

[76] Inventors: Anthony V. Beran, 3118 Apline, Santa Ana, Calif. 92704; Gordon Shigezawa, 34 Cresthaven, Irvine, Calif. 92714

[21] Appl. No.: 537,030

[22] Filed: Jun. 12, 1990

[51] Int. Cl.[5] ............................................. G71K 7/22
[52] U.S. Cl. .................................... 374/183; 340/584; 340/595
[58] Field of Search ......................... 324/104, 105, 106; 338/22 R; 340/509, 573, 584, 595, 620; 364/552; 374/183; 128/736

[56] References Cited

U.S. PATENT DOCUMENTS

| | | |
|---|---|---|
| 2,938,385 | 5/1960 | Mack et al. . |
| 3,069,909 | 12/1962 | Hines . |
| 3,413,853 | 12/1968 | Rowell . |
| 3,434,349 | 3/1969 | Frischmann . |
| 3,538,771 | 11/1970 | Akeley . |
| 3,580,074 | 5/1971 | Wescott et al. . |
| 3,582,761 | 6/1971 | Hall . |
| 3,688,580 | 9/1972 | Jarzembski . |
| 3,728,702 | 4/1973 | Miyamoto et al. ................. 340/595 |
| 3,842,674 | 10/1974 | Wilbur et al. . |
| 3,906,391 | 9/1975 | Murdock . |
| 3,913,403 | 10/1975 | Arcara ........................... 374/183 X |
| 4,023,094 | 5/1977 | Adams ........................... 374/183 X |
| 4,025,847 | 5/1977 | Washburn ....................... 374/183 X |
| 4,087,696 | 5/1978 | Bull . |
| 4,161,880 | 7/1979 | Prosky . |
| 4,169,243 | 9/1979 | Payne et al. .................... 374/183 X |
| 4,435,692 | 3/1984 | Miyamoto et al. . |
| 4,446,715 | 5/1984 | Bailey . |
| 4,481,596 | 11/1984 | Townzen . |
| 4,482,261 | 11/1984 | Dewey et al. . |
| 4,588,308 | 5/1986 | Salto . |
| 4,635,204 | 12/1987 | Haque . |
| 4,669,049 | 5/1987 | Kosednar et al. . |
| 4,783,175 | 11/1988 | Sugimori ........................ 128/736 |
| 4,785,250 | 11/1988 | Lawton . |
| 4,857,002 | 8/1989 | Jensen et al. . |

FOREIGN PATENT DOCUMENTS 1085366 2/1955 France .
142775 12/1930 Switzerland .

OTHER PUBLICATIONS

"Any Voltmeter Reads Electronic Thermometer", by Robert J. Battes, *Electronics,* Sep. 5, 1974.
"Test Circuit Enables Voltmeter to Check Electrolytic Capacitors," by Mark Anglin, *Electronics,* Sep. 5, 1974, p. 125.
"1989 Electronics for Measurement, Analysis, Computation," by Hewlett-Packard.
"Instantaneous-Frequency Meter Measures Biomedical Variables," by T. G. Barnett et al., *Electronics,* Aug. 30, 1979, p. 143.
"Voltage-Controlled Resistance Switches Over Preset Limits," by Chris Tocci, *Electronics,* Sep. 25, 1980, p. 133.
"RC Oscillator Linearizes Thermistor Output," by B. Sundqvist, *Electronics,* Jan. 13, 1983, pp. 169 and 171.
"Dual Function Amp Chip Simplifies Many Circuits," by Jim Williams, *Electronics,* May 5, 1981, pp. 142-143 and 146.
"Mon-A-Therm Temperature Monitoring System Product Catalog," by Mon-A-Therm, Inc.
"Monolithic CMOS-Switch IC Suits Diverse Applications," by Jim Williams, *EDN,* Oct. 4, 1984, pp. 183-192 and 194.
"Switched Capacitors Unlock Filters," *EDN,* Apr. 3, 1986, pp. 142-143.

*Primary Examiner*—William A. Cuchlinski, Jr.
*Assistant Examiner*—G. Bradley Bennett
*Attorney, Agent, or Firm*—Price, Gess & Ubell

[57] ABSTRACT

A single 400 series thermistor is interfaced to a patient monitor designed to accept only dual thermistor probes by a circuit including first and second cascaded negative impedance converters connected to first and second discrete resistors. The first and second discrete resistors are operative to alter the slope of and shift the resistance versus temperature characteristic of the circuit, while the negative impedance converters scale the characteristic.

10 Claims, 3 Drawing Sheets

SINGLE THERMISTOR/ANALOG CONVERTER SUBSTITUTE FOR A DUAL THERMISTOR NETWORK

BACKGROUND OF THE INVENTION

1. Field of the Invention

The subject invention relates generally to electronic circuitry for use in the medical field and, more particularly, to an active analog circuit for connection to a single thermistor to cause the combination analog circuit and thermistor to exhibit a characteristic like that of a two-thermistor circuit.

2. Description of Related Art

Use of disposable temperature probes for single patient application is common today because of the high cost of cleaning and resterilizing medical products. The well-known 700 series disposable temperature probe is considerably more costly than single thermistor disposable temperature probes. Most of the additional cost of the 700 series probe is attributable to the cost of the sensor element of the probe, which employs two thermistors.

Unfortunately, manufacturers of patient monitors continue to make monitors which use only the 700 series, dual thermistor probes. Users of such patient monitors are forced to purchase 700 series probes or an electronic adapter. The typical electronic adapter accepts signals from a low cost thermocouple-type probe and simulates the resistances of the 700 series thermistor elements. This type of electronic adapter invariably uses a microprocessor, analog-to-digital converter, and some sort of digital-to-analog conversion to perform its function. The net result is a complex, high-cost device requiring maintenance for batteries and calibration. While such an adapter allows use of low cost thermocouple probes, it also adds the cost of maintenance, battery replacement, and calibration, as well as introducing its own errors to the temperature monitoring procedure.

Some users have a mix of instruments and are currently purchasing both 400 and 700 series thermistors or converting thermocouple signals through electronic adapters. It would prove far more convenient for such users to purchase only less expensive 400 series disposable probes for connection to their 700 series instruments. Their 400 series instruments would continue to accept a direct connection to the 400 series probes.

SUMMARY OF THE INVENTION

It is therefore an object of the invention to improve disposable temperature probes;

It is another object of the invention to reduce the cost of disposable temperature probes;

It is an additional object of the invention to provide a circuit employing a single thermistor and having a resistance versus temperature characteristic comparable to that of a two-thermistor or 700 series disposable probe; and It is another object of the invention to provide an adapter permitting 700 series instruments to employ 400 series thermistors.

According to the invention, a single thermistor and attendant circuitry substitutes for a dual-thermistor sensor. The circuitry includes a resistance multiplier comprising two cascaded stages of negative impedance converters. The resistance multiplier scales the small change in resistance of the single thermistor over the clinical temperature range to approximate the larger change in resistance of the two thermistor network. An additional shunt resistor alters the slope of the scaled single thermistor curve, while a series resistor shifts the curve. Accuracy through the system suitable for clinical temperature monitoring is achieved.

BRIEF DESCRIPTION OF THE DRAWINGS

The just-summarized invention will now be described in detail in conjunction with the drawings, of which.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the arts, since the generic principles of the present invention have been defined herein specifically to provide a single thermistor and analog converter circuit advantageously suited to substitute for a 700 series dual thermistor circuit.

Figure 1:
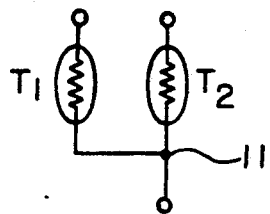
FIG. 1 is a circuit schematic of a prior art dual thermistor circuit.

The Yellow Springs Instrument (YSI) 700 series thermistor is a composite structure consisting of two thermistors T1, T2 with one lead connected in common at a junction 11, as shown in FIG. 1. Both thermistors T1, T2 are assumed equilibrated to the same temperature. The resistance in kilo ohms (kΩs) versus temperature characteristic of the YSI thermistors $T_1$, $T_2$ is illustrated in the following table:

| TEMP (°C.) | T1 (kΩ) | T2 (kΩ) |
|---|---|---|
| 0 | 19.59 | 94.98 |
| 5 | 15.24 | 74.44 |
| 10 | 11.94 | 58.75 |
| 15 | 9.428 | 46.67 |
| 20 | 7.496 | 37.3 |
| 25 | 6 | 30 |
| 30 | 4.834 | 24.27 |
| 35 | 3.918 | 19.74 |
| 40 | 3.196 | 16.15 |
| 45 | 2.62 | 13.28 |
| 50 | 2.162 | 10.97 |
| 55 | 1.792 | 9.109 |

The thermistor assembly of FIG. 1 is typically connected to a half bridge circuit (FIG. 2) consisting of two fixed resistors, R1 and R2, and a regulated voltage source $V_{reg}$. The values of the fixed resistors R1, R2 are chosen to minimize nonlinearity of the voltage output ($V_{out}$) over the range of the desired measurement temperatures.

Figure 3:
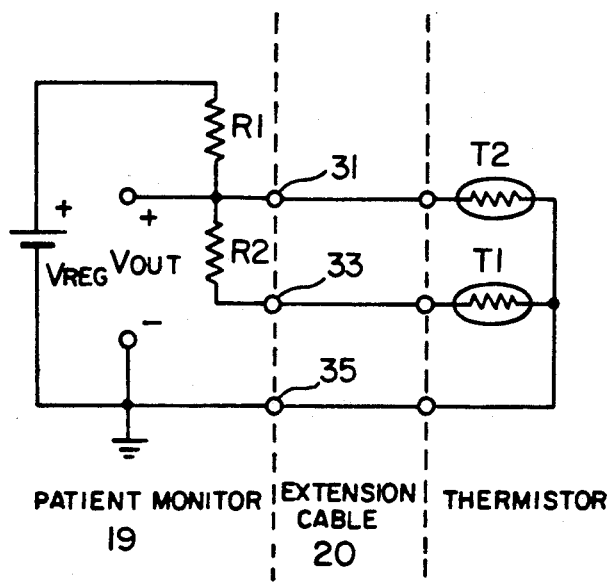
FIG. 3 is a circuit schematic of an application of the circuit of FIG. 2 to a patient monitor.

In a clinical patient temperature monitor application, the fixed resistors R1, R2 are located in the patient monitor 19 and interconnection of the thermistor elements T1, T2 is achieved through a three-conductor cable 20 as shown in FIG. 3.

Figure 2:
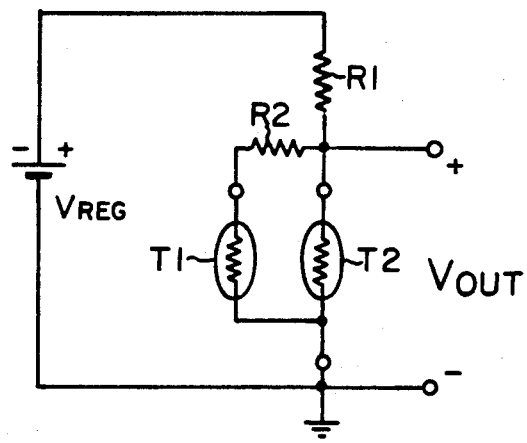
FIG. 2 is a circuit schematic of a prior application of the circuit of FIG. 1.
Figure 4:
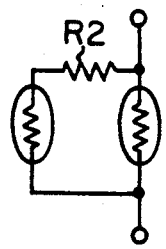
FIG. 4 is a circuit schematic of a prior art dual thermistor circuit.
Figure 5:
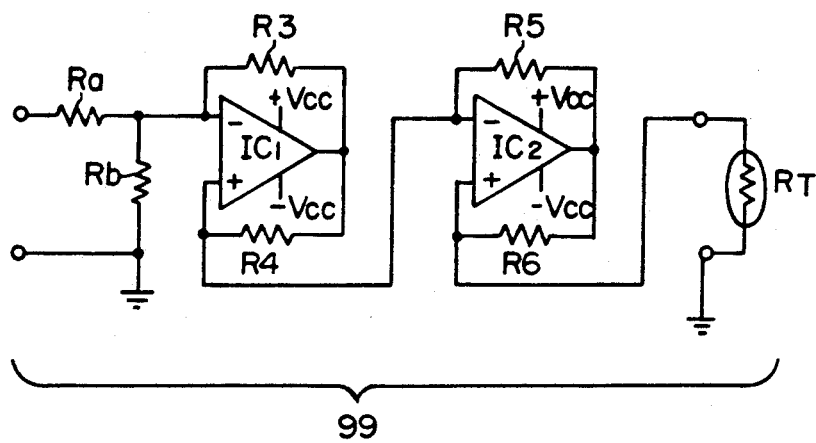
FIG. 5 is a circuit schematic of the preferred embodiment of the invention.

According to the preferred embodiment, the network of the dual-thermistor elements T1, T2 and R2 shown in FIG. 4 and used in FIG. 2 is replaced by the substitute circuit 99 and single thermistor $R_T$ of FIG. 5. The circuit of FIG. 5 includes first and second resistors $R_a$, $R_b$, first and second amplifiers $IC_1$, $IC_2$, and a 400 series thermistor $R_T$.

The first and second amplifiers $IC_1$, $IC_2$ may be Part No. TLC27L7 as manufactured by Texas Instruments or others. The amplifiers $IC_1$, $IC_2$ are powered by respective positive and negative supply voltages $+V_{cc}$ and $-V_{cc}$. A resistor $R_3$ and a resistor $R_4$ connect from the output of the first amplifier $IC_1$, respectively, to the inverting and noninverting inputs of the amplifier $IC_1$. A resistor $R_5$ and a resistor $R_6$ connect from the output of the second amplifier $IC_2$, respectively, to the inverting and noninverting inputs of the second amplifier $IC_2$. The noninverting input of the first amplifier is further connected to the inverting input of the second amplifier $IC_2$.

The circuit of FIG. 5 functions as a resistance multiplier having two cascaded stages of negative impedance converters. Each stage is characterized by having the input resistance (impedance) at the input port being the negative times some constant of the resistance (impedance) connected to the output port. Cascading two stages leaves the input resistance as the product of the multiplicative constant of both stages times the input resistance. Since both multiplicative constants are negative, the terms cancel in sign leaving a positive input resistance for a positive output resistance multiplied by the product of the magnitudes of each stage. For the circuit shown in FIG. 5, $R = (R_3/R_4) \times (R_5/R_6) \times R_T$.

The cascaded stages formed with the first and second amplifiers $IC_1$, $IC_2$ scale the small change in resistance of the 400 series thermistor $R_T$ over the clinical temperature range to approximate the larger change in resistance of the network of FIG. 4. The resistor $R_b$ functions to alter the slope of the scaled 400 series curve, while the series resistor $R_a$ shifts the curve, i.e., moves all points on the curve the same distance, in the same direction.

In a breadboarded version of the analog converter of FIG. 5, the values of $R_3$ through $R_6$ were 1.33KΩ, 605 ohms, 2.87KΩ, and 1.45KΩ, respectively. This combination of resistor values yields a multiplication of 4.352. The $R_a$ and $R_b$ values were 3.140K and 47.50KΩ, respectively. Needless to say, other combinations may be utilized to achieve the same or similar ends. The amplifier was a Texas Instruments TLC27L7 dual operational amplifier. Any low offset and low bias current amplifier may be substituted for the TLC27L7.

Figure 6:
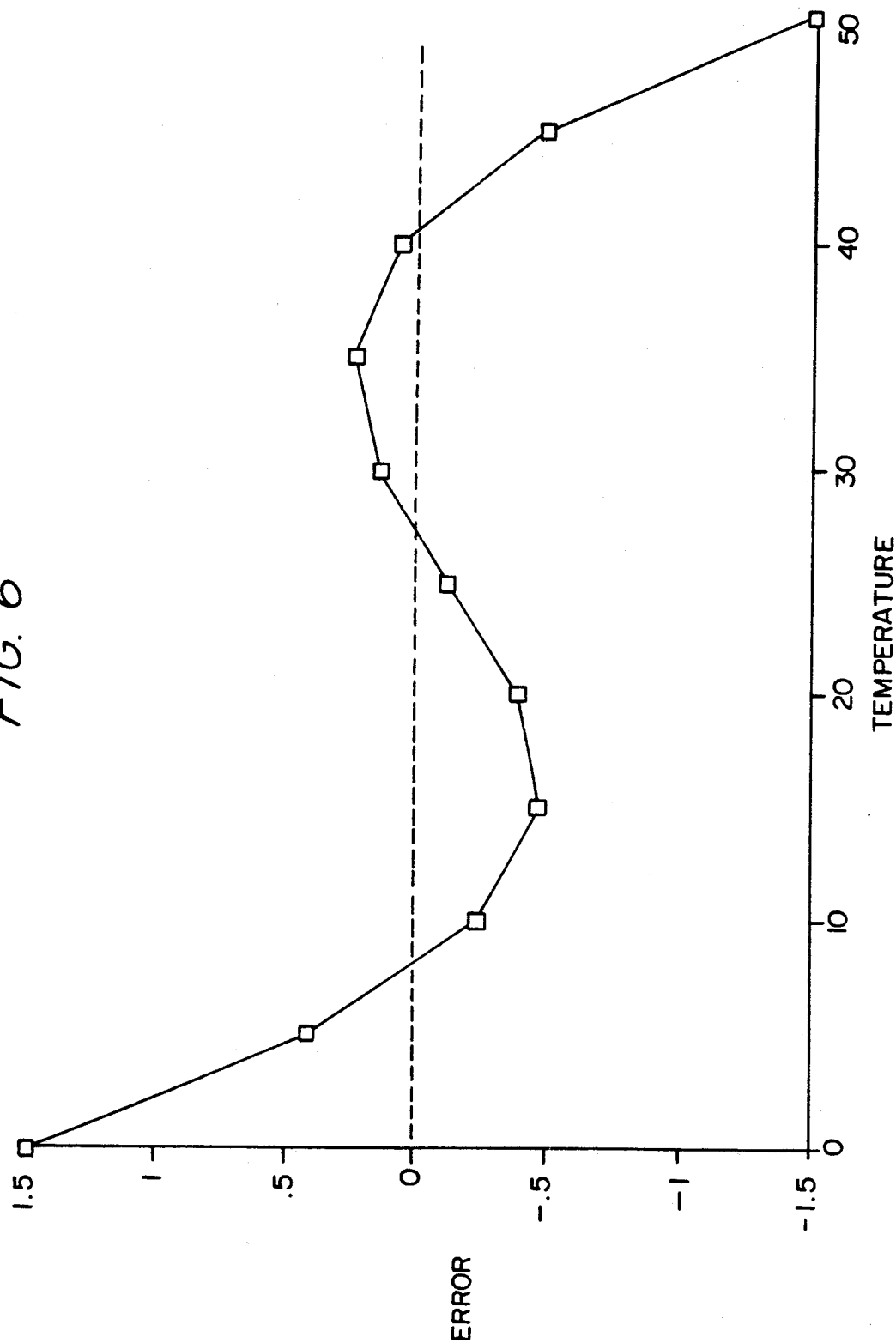
FIG. 6 is a graph of error versus temperature between the resistance versus temperature characteristics of circuits according to FIG. 4 and FIG. 5.

A commercially-available thermistor suitable for use as the single thermistor 101 is the Thermometrics Type A, 2.252KΩ at 25° C. The resultant resistance-temperature curve through the analog converter closely fits that of the dual-thermistor circuit of FIG. 4. The temperature error in degrees centigrade (C) between the resistance temperature characteristic of the circuit of FIG. 4 and that of FIG. 5 is plotted in FIG. 6. The errors depicted in FIG. 6 are low enough to permit the use of the circuit of FIG. 7, including the preferred substitute thermistor circuit of FIG. 5, for clinical temperature monitoring.

Figure 7:
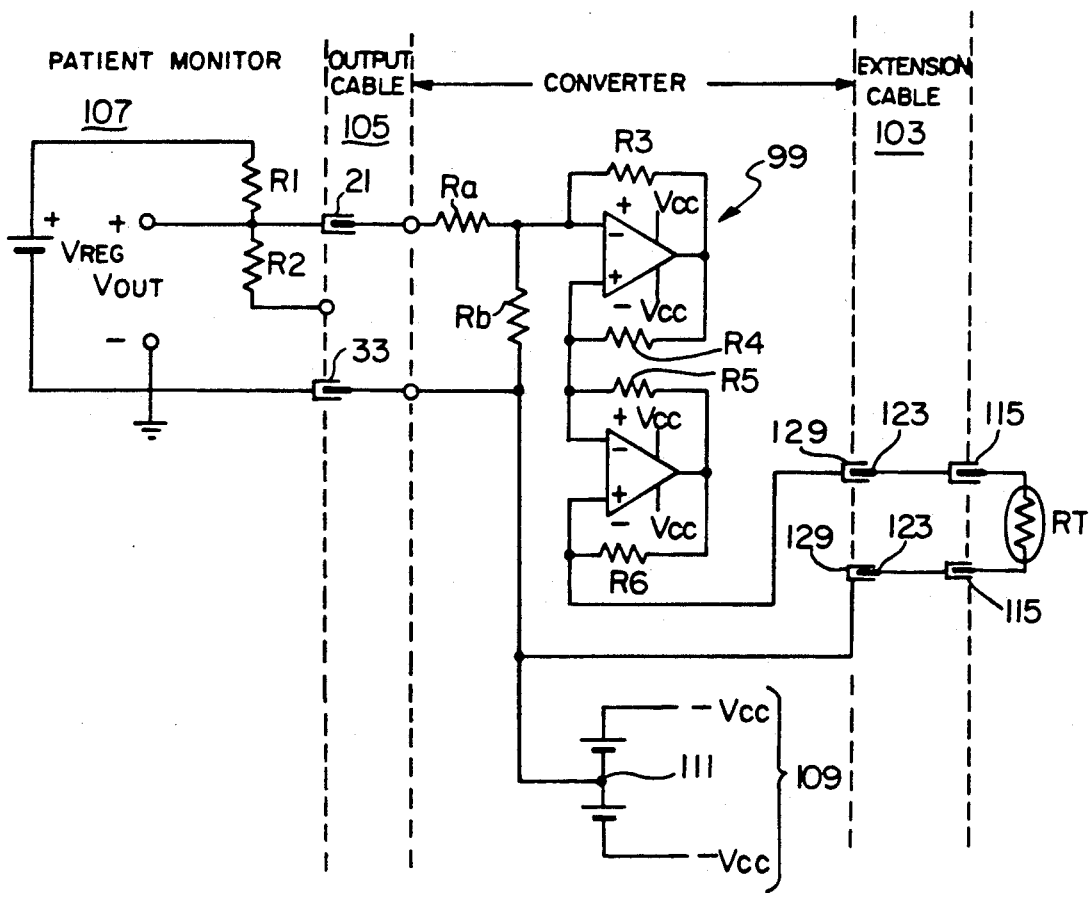
FIG. 7 is a circuit schematic showing application of the preferred embodiment connected to a patient monitor.

In FIG. 7, the converter circuit 99 is installed between a two-wire extension cable 103 and a two-wire output cable 105. The extension cable 103 removably connects to a temperature probe including the 400 series thermistor $R_T$. The output cable 105 connects two input points 31, 35 of the three available input points or terminals 31, 33, 35 of the typical patient monitor 107, originally designed to accept the 700 series probes. A battery source 109 supplies the $+V_{cc}$ and $-V_{cc}$ supply voltages and a neutral point 111. Terminal 33 of the patient monitor is left unconnected.

The 400 series thermistor $R_T$ and probe housing assembly is a disposable unit to be sued once by insertion or attachment at a suitable body site, then discarded. The temperature probe includes a low cost, two terminal connector 115 interfacing with a mating two terminal connector 119 of the cable 103. The cable 103 in turn includes a two terminal connector 123 interfacing with a mating two terminal connector 129 of the adapter unit, which contains the resistance multiplier circuit 99 and the batteries 109. The second cable 105 exits the resistance multiplier's enclosure and plugs into the patient monitor 107, as discussed above.

Those skilled in the art will appreciate that various adaptations and modification of the just-described preferred embodiment can be configured without departing from the scope and spirit of the invention. Therefore, it is to be understood that, within the scope of the appended claims, the invention may be practiced other than as specifically described herein.

What is claimed is:

1. An electrical circuit for adapting a single thermistor to simulate the resistance of a dual thermistor circuit, said resistance of said dual thermistor circuit varying with temperature in a manner different from the resistance of said single thermistor, said electrical circuit comprising:

means for multiplying the resistance of the single thermistor to approximate the scale of the change in resistance with temperature of the dual thermistor circuit resulting in a scaled resistance versus temperature curve; and means for shifting and altering the slope of said scaled resistance versus temperature curve to cause said curve to match the change in resistance with temperature of the dual thermistor circuit.

2. The electrical circuit of claim 1 wherein said resistance multiplying means comprises:

a first negative impedance converter means having an input and an output, said output being connected to said single thermistor; and a second negative impedance converter means having first and second inputs and an output, the input of said first negative impedance converter means being connected to the second input of said second negative impedance converter means.

3. The electrical circuit of claim 2 wherein said means of shifting and altering comprises:

a first resistor connected in series to the first input of said second negative impedance converter means; and a second resistor connected in parallel between the first input of said second negative impedance converter means and ground.

4. The electrical circuit of claim 3 wherein said first and second negative impedance converter means each comprise:
- an amplifier having an inverting and a noninverting input and an amplifier output;
- a first resistor connected between said noninverting input and said amplifier output; and
- a second resistor connected between said inverting input and said amplifier output.

5. Patient temperature monitoring circuitry comprising:
- an extension cable;
- a temperature probe including a single thermistor having a resistance versus temperature curve;
- adapter circuit means comprising means for multiplying said resistance versus temperature curve, shifting said curve and altering the slope of said curve; and
- connector means for removably connecting said temperature probe to said extension cable and for removably connecting said cable to said adapter circuit means.

6. The electrical circuit of claim 5 wherein said multiplying means comprises:
- a first negative impedance converter means having an input and an output, said output being connected to said single thermistor; and
- a second negative impedance converter means having first and second inputs and an output, the input of said first negative impedance converter means being connected to the second input of said second negative impedance converter means.

7. The electrical circuit of claim 6 wherein said means for shifting and altering comprises:
- a first resistor connected in series to the first input of said second negative impedance converter means; and a second resistor connected in parallel between the first input of said second negative impedance converter means and ground.

8. The electrical circuit of claim 7 wherein said first and second negative impedance converter means each comprise:
- an amplifier having an inverting and a noninverting input and an amplifier output;
- a first resistor connected between said noninverting input and said amplifier output; and
- a second resistor connected between said inverting input and said amplifier output.

9. Temperature probe apparatus comprising:
- a single thermistor;
- a first negative impedance converter means having an input and an output, said output being connected to said single thermistor;
- a second negative impedance converter means having first and second inputs and an output, the input of said first negative impedance converter means being connected to the second input of said second negative impedance converter means;
- a first resistor connected in series to the first input of said second negative impedance converter means; and a second resistor connected in parallel between the first input of said second negative impedance converter means and ground; and
- wherein said first converter means includes first and second resistors and said second converter means includes third and fourth resistors; and
- wherein said first and second converter means further cooperate to multiply the resistance of said single thermistor by a scale factor which is the product of the first and third resistors divided by the product of the second and fourth resistors.

10. The probe apparatus of claim 9 wherein the values of said first, second, third and fourth resistors are selected to match the scale of the resistance versus temperature of a selected dual thermistor probe.

* * * * *